(12) United States Patent
Haraguchi et al.

(10) Patent No.: US 11,735,885 B2
(45) Date of Patent: Aug. 22, 2023

(54) LASER DEVICE

(71) Applicant: Mitsubishi Electric Corporation, Tokyo (JP)

(72) Inventors: Eisuke Haraguchi, Tokyo (JP); Toshiyuki Ando, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 127 days.

(21) Appl. No.: 17/510,933

(22) Filed: Oct. 26, 2021

(65) Prior Publication Data
US 2022/0052505 A1    Feb. 17, 2022

Related U.S. Application Data

(63) Continuation of application No. PCT/JP2019/021598, filed on May 30, 2019.

(51) Int. Cl.
*H01S 5/10*    (2021.01)
*H01S 3/13*    (2006.01)
*H01S 3/10*    (2006.01)

(52) U.S. Cl.
CPC ........ *H01S 3/1307* (2013.01); *H01S 3/10053* (2013.01); *H01S 3/1304* (2013.01); *H01S 3/1305* (2013.01)

(58) Field of Classification Search
CPC .. H01S 3/0085; H01S 3/10053; H01S 3/1305; H01S 3/1307; H01S 3/2383
See application file for complete search history.

(56) References Cited

U.S. PATENT DOCUMENTS

| | | | |
|---|---|---|---|
| 6,366,356 B1 | 4/2002 | Brosnan et al. | |
| 8,503,070 B1* | 8/2013 | Henry | H01S 3/2383 359/341.1 |
| 10,008,821 B1* | 6/2018 | Goodno | H01S 3/06783 |
| 2007/0201795 A1* | 8/2007 | Rice | H01S 3/2383 385/39 |
| 2008/0037028 A1* | 2/2008 | Cheung | H01S 3/2383 356/478 |
| 2021/0376549 A1* | 12/2021 | Kleinert | G02F 1/292 |

FOREIGN PATENT DOCUMENTS

| | | |
|---|---|---|
| JP | 2000-323774 A | 11/2000 |
| JP | 2014-216418 A | 11/2014 |

* cited by examiner

*Primary Examiner* — Michael Carter
(74) *Attorney, Agent, or Firm* — Birch, Stewart, Kolasch & Birch, LLP (57) ABSTRACT

A laser device includes element circuits, a front optical system, and a reflective optical system. The front optical system forms a plurality of light beams by collimating a plurality of phase modulated light signals input from the element circuits, and generate a plurality of partially reflected light signals by partially reflecting the plurality of phase modulated light signals. The reflective optical system multiplexes the input local oscillation light with the plurality of partially reflected light signals by reflecting the local oscillation light in a direction of the front optical system. The element circuits can convert each of a plurality of interference light signals generated by multiplexing of the plurality of partially reflected light signals and the local oscillation light into a plurality of electric signals, and can detect a phase error between the plurality of electric signals and a reference signal.

18 Claims, 9 Drawing Sheets

LASER DEVICE

CROSS REFERENCE TO RELATED APPLICATION

This application is a Continuation of PCT International Application No. PCT/JP2019/021598, filed on May 30, 2019, which is hereby expressly incorporated by reference into the present application.

TECHNICAL FIELD

The present invention relates to a laser technique for generating high-power laser light by coherently combining a plurality of laser outputs to each other.

BACKGROUND ART

As a method for implementing a high-power laser system, a coherent beam combining (CBC) technique is known in which a single laser light beam is used as seed light, the laser light beam is split into light beams of a plurality of paths, and the light beams are amplified and then coherently combined to each other. In order to implement a high-output and high-luminance laser, it is necessary to align phases of the light beams of a plurality of paths. A laser system using a coherent beam combining technique is disclosed in, for example, Patent Literature 1 (JP 2000-323774 A) and Patent Literature 2 (JP 2014-216418 A).

A laser system disclosed in Patent Literature 1 includes: a master oscillator for outputting a primary laser signal and local oscillation light; a beam splitter array for splitting the primary laser signal into N secondary laser signals (N is a positive integer); a phase modulator array for individually modulating phases of the N secondary laser signals and outputting N phase modulation signals; a plurality of fiber amplifiers for generating N amplified light signals by amplifying the N phase modulation signals; a collimator (lens array) for forming an output light beam by collimating the N amplified light signals; a beam splitter for partially separating light of the output light beam; a frequency shifter for shifting a frequency of the local oscillation light and outputting frequency shifted light; an interferometer for generating heterodyne light by multiplexing light separated by the beam splitter and frequency shifted light; a photodetector for generating an RF beat frequency signal by detecting the heterodyne light; and a phase control circuit group for controlling individual phase shift amounts in the phase modulator array on the basis of the RF beat frequency signal.

In the laser system disclosed in Patent Literature 1, when the number N of signals is large, a configuration of optical components required for multiplexing with local oscillation light is huge disadvantageously. In addition, when the number N of signals is large, highly accurate adjustment of alignment of each of the collimator (lens array) and the interferometer is required disadvantageously.

Patent Literature 2 discloses a phase-locked laser device intended to solve such disadvantages. The phase-locked laser device includes: two splitters for splitting a single laser light beam into N signal light beams and local oscillation light; N frequency shifters for performing frequency shift on the respective N signal light beams; N phase modulators for performing phase modulation on light outputs of the respective N frequency shifters; N light amplifiers for amplifying light outputs of the respective N phase modulators; and a light component array for generating N output light beams by collimating light outputs of the N light amplifiers. The light component array includes: a collimator for collimating the local oscillation light; N tap mirrors for generating multiplexed light by multiplexing the collimated local oscillation light and the N output light beams; and a photodetector for converting the multiplexed light into an electric signal. The phase-locked laser device further includes N frequency discriminator circuits for separating N dithering signals for phase modulation control from an output signal of the photodetector.

CITATION LIST

Patent Literatures

Patent Literature 1: JP 2000-323774 A (see, for example, FIG. 1)
Patent Literature 2: JP 2014-216418 A (see, for example, FIGS. 1 and 2)

SUMMARY OF INVENTION

Technical Problem

In the phase-locked laser device of Patent Literature 2, it is possible to reduce the size of a configuration of optical components required for multiplexing with local oscillation light. However, as described above, the photodetector converts the multiplexed light into an electric signal, and the N frequency discriminator circuits separate N dithering signals for phase modulation control from an output signal of the photodetector. Therefore, the number N of signals is limited by band characteristics of the photodetector and band characteristics of the N frequency discriminator circuits disadvantageously.

In view of the above, an object of the present invention is to provide a laser device capable of increasing the number of signals and reducing the size of a device configuration required for coherent beam combining.

Solution to Problem

A laser device according to an aspect of the present invention includes: a light distributor distributing reference laser light into local oscillation light and a plurality of light signals; a plurality of optical phase controllers generating a plurality of phase control light signals by performing variable phase control on each of the plurality of light signals in accordance with a plurality of input light phase control signals; a plurality of light amplifiers generating a plurality of amplified light signals by amplifying the plurality of phase control light signals; a front optical system forming a plurality of light beams by collimating the plurality of amplified light signals and generating a plurality of partially reflected light signals propagating in a direction opposite to a propagation direction of the plurality of light beams by partially reflecting the plurality of amplified light signals; a reflective optical system multiplexing the local oscillation light with the plurality of partially reflected light signals by reflecting the local oscillation light input from the light distributor in a direction of the front optical system; a plurality of photodetectors converting each of a plurality of interference light signals generated by multiplexing of the plurality of partially reflected light signals and the local oscillation light into a plurality of electric signals; and a plurality of phase locked loops generating, as the plurality of light phase control signals, a plurality of control signals for causing the plurality of optical phase controllers to compensate for phase errors between the plurality of electric signals and a reference signal.

Advantageous Effects of Invention

According to an aspect of the present invention, the plurality of photodetectors converts each of the plurality of interference light signals generated by multiplexing of the plurality of partially reflected light signals propagated from the front optical system in the opposite direction and the local oscillation light into a plurality of electric signals. The plurality of phase locked loops can generate a plurality of light phase control signals for phase error compensation on the basis of the plurality of electric signals. Therefore, since the degree to which the number of the light signal is limited by the band characteristics of the photodetectors is low, the number of signals can be increased, and the size of a device configuration required for coherent beam combining can be reduced.

DESCRIPTION OF EMBODIMENTS

Hereinafter, various embodiments according to the present invention will be described in detail with reference to the drawings. Note that constituent elements denoted by the same reference symbol throughout the drawings have the same configuration and the same function.

First Embodiment

Figure 1:
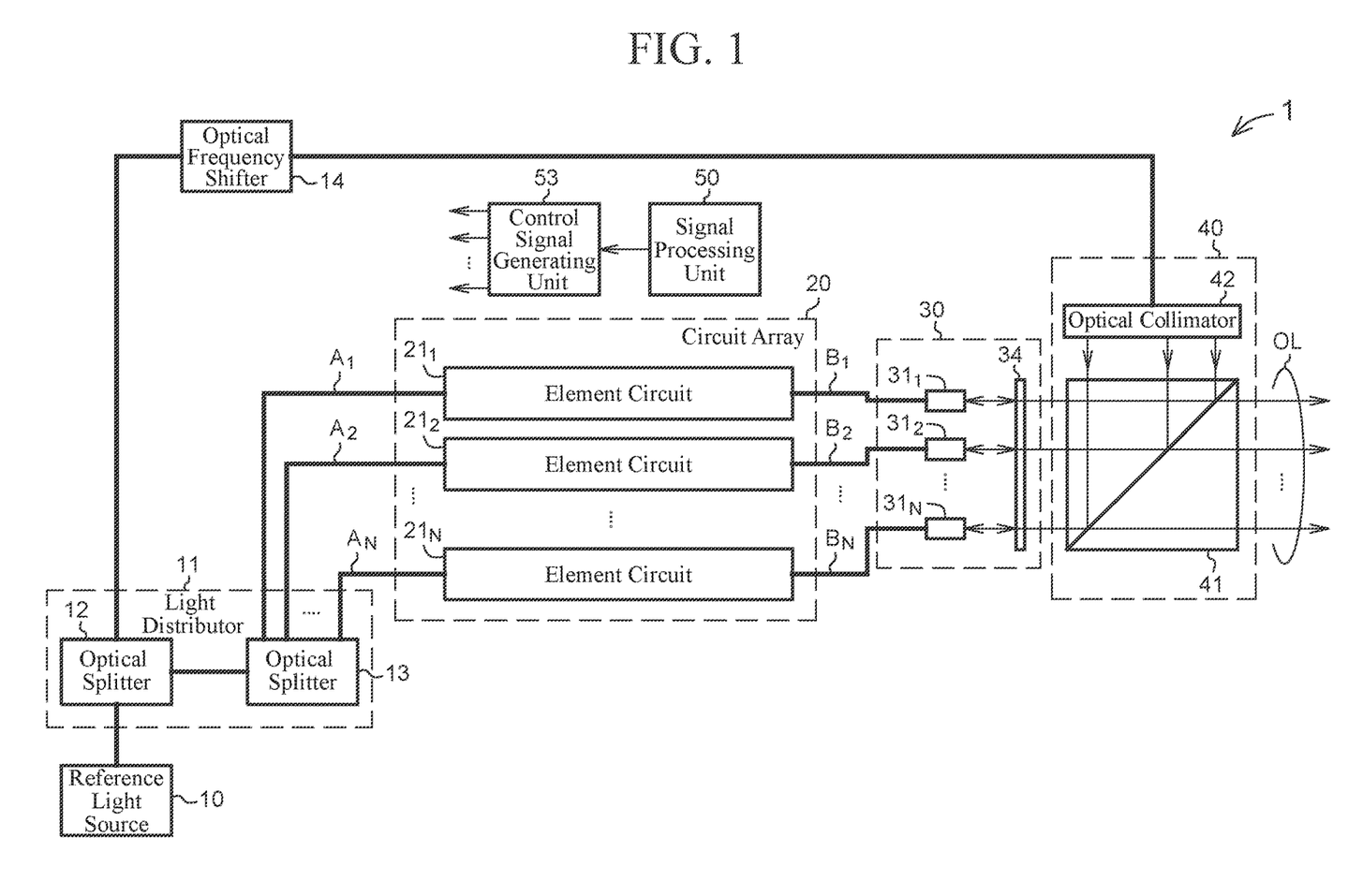
FIG. 1 is a diagram illustrating a schematic configuration of a laser device of a first embodiment according to the present invention.

FIG. 1 is a diagram illustrating a schematic configuration of a laser device 1 of a first embodiment according to the present invention. As illustrated in FIG. 1, the laser device 1 includes: a reference light source 10 for outputting reference laser light having a single frequency; a light distributor 11 for distributing the reference laser light into local oscillation light and N light signals (N is a positive integer of 2 or more); a light frequency shifter 14 for shifting a light frequency of the local oscillation light; a circuit array 20 that functions as an optical phased array for generating N phase modulated light signals (phase control light signals) by applying variable phase modulation (variable phase control) to each of the N light signals; a front optical system 30 for collimating the N phase modulated light signals input from element circuits $21_1$ to $21_N$; a beam combining optical system (reflective optical system) 40 for outputting a bundle OL of N collimated light beams input from the front optical system 30 to space; a signal processing unit 50 for performing signal processing required for light phase control; and a control signal generating unit 53 for generating a phase control signal to be supplied to the element circuits $21_1$ to $21_N$.

The reference light source 10 and the light distributor 11 are connected to each other via a light path such as an optical fiber. As the reference light source 10, for example, a narrow linewidth laser light source that oscillates in a single mode can be used.

The light distributor 11 includes two optical splitters 12 and 13. The optical splitter 12 splits reference laser light input from the reference light source 10 into local oscillation light and signal light, supplies the local oscillation light to the light frequency shifter 14 via a light path, and supplies the signal light to the optical splitter 13. The optical splitter 13 splits the input signal light into N light signals, and supplies the N light signals to the circuit array 20 via light paths $A_1, A_2, \ldots,$ and $A_N$ such as optical fibers.

The circuit array 20 includes N element circuits $21_1, 21_2, \ldots,$ and $21_N$ arranged in parallel as illustrated in FIG. 1. First ends of the element circuits $21_1, 21_2, \ldots,$ and $21_N$ are optically coupled to light output terminals of the light paths $A_1, A_2, \ldots,$ and $A_N$, respectively. Second ends of the element circuits $21_1, 21_2, \ldots,$ and $21_N$ are optically coupled to light paths $B_1, B_2, \ldots,$ and $B_N$ such as optical fibers, respectively. The element circuits $21_1$ to $21_N$ have the same configuration, and have a function of generating N phase modulated light signals (phase control light signals) by applying variable phase modulation (variable phase control) to light signals input from the light paths $A_1$ to $A_N$ and a function of amplifying the N phase modulated light signals.

Figure 2:
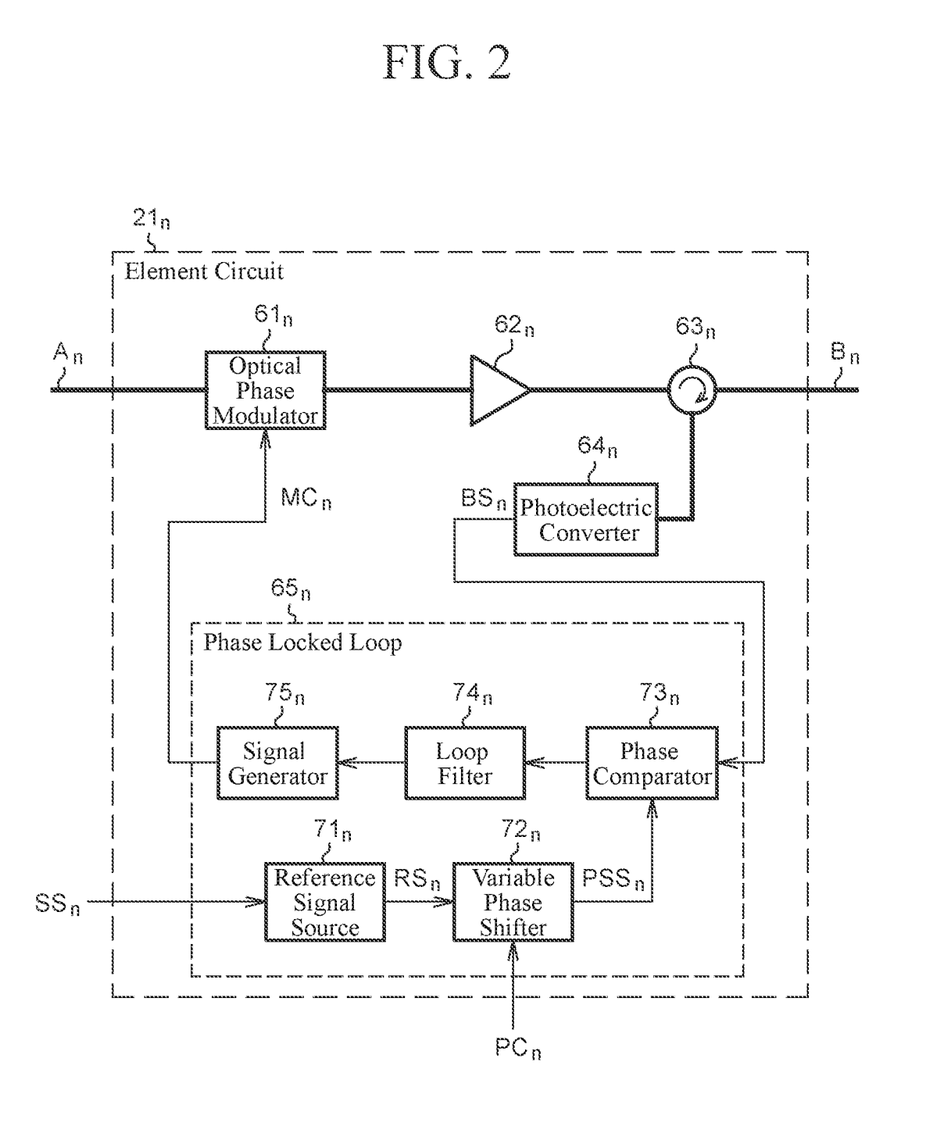
FIG. 2 is a diagram schematically illustrating a configuration example of an element circuit of the first embodiment.

FIG. 2 is a diagram illustrating an example of a schematic configuration of an n-th element circuit $21_n$ out of the element circuits $21_1$ to $21_N$. Here, the suffix n is an integer within a range of 1 to N. As illustrated in FIG. 2, the element circuit $21_n$ includes an optical phase modulator $61_n$, a light amplifier $62_n$, a light circulator $63_n$, a photoelectric converter $64_n$, and a phase locked loop $65_n$.

The optical phase modulator $61_n$ is a variable phase controller that operates in accordance with a light phase control signal $MC_n$ supplied from the phase locked loop $65_n$. The optical phase modulator $61_n$ generates a phase modulated light signal by modulating a phase of a light signal input from the light path $A_n$. As the optical phase modulator $61_n$, for example, an LN (LiNbO$_3$) phase modulator or a semiconductor light modulator can be used. The light amplifier $62_n$ amplifies a light output of the optical phase modulator $61_n$, and outputs that amplified light signal (amplified phase modulated light signal) to the light path $B_n$ via the light circulator $63_n$.

The light circulator $63_n$ is a light nonreciprocal element for outputting the amplified light signal input from the light amplifier $62_n$ only to the light path $B_n$ and outputting the light signal input from the light path $B_n$ only to the photoelectric converter $64_n$. In other words, the light circulator $63_n$ has a function of separating the amplified light signal input from the light amplifier $62_n$ and the light signal input from the light path $B_n$ from each other. The photoelectric converter 64 converts the light signal into an electric signal $BS_n$ and outputs the electric signal $BS_n$ to the phase locked loop $65_n$. As the photoelectric converter $64_n$, for example, a photodiode can be used.

The phase locked loop $65_n$ includes a reference signal source $71_n$, a variable phase shifter $72_n$, a phase comparator $73_n$, a loop filter $74_n$, and a signal generator $75_n$. The reference signal source $71_n$ operates in accordance with a synchronous signal $SS_n$ supplied from the control signal generating unit 53, and outputs a reference signal (reference oscillation wave) $RS_n$ having a reference frequency in a high frequency band to the variable phase shifter $72_n$. The synchronous signal $SS_n$ is a signal for synchronizing the element circuits $21_1$ to $21_N$.

The variable phase shifter $72_n$ operates in accordance with a phase control signal $PC_n$ supplied from the control signal generating unit 53, and generates a phase shift signal $PSS_n$ by shifting a phase of the reference signal $RS_n$. The phase shift amount is controlled in accordance with the phase control signal $PC_n$. The phase comparator $73_n$ outputs a phase error signal having a current or a voltage corresponding to a phase error between the electric signal $BS_n$ input from the photoelectric converter $64_n$ and the phase shift signal $PSS_n$ to the loop filter $74_n$. The loop filter $74_n$ generates a control voltage by filtering an output of the phase comparator $73_n$. Then, the signal generator $75_n$ can supply the light phase control signal $MC_n$ having an oscillation frequency corresponding to the control voltage input from the loop filter $74_n$ to the optical phase modulator $61_n$. Note that the configuration of the phase locked loop $65_n$ illustrated in FIG. 2 is an example, and it is not limited thereto.

Referring to FIG. 1, the front optical system 30 includes N optical collimators $31_1$, $31_2$, ..., and $31_N$ and a partial reflector 34. The optical collimators $31_1$, $31_2$, ..., and $31_N$ form N light beams by collimating amplified light signals (amplified phase modulated light signals) input from the light paths $B_1$, $B_2$, ..., and $B_N$, respectively, and output the N light beams to the partial reflector 34 via space. As the optical collimators $31_1$, $31_2$, ..., and $31_N$, optical collimator lenses may be used.

The partial reflector 34 transmits most of the input N light beams, and at the same time, generates N partially reflected light signals propagating in the opposite direction by partially reflecting the input N light beams. The N partially reflected light signals return to the light paths $B_1$ to $B_N$ via the optical collimator $31_1$ to $31_N$, respectively. As the partial reflector 34, a partial reflection mirror may be used.

The beam combining optical system 40 includes: an optical beam splitter 41 for outputting a bundle OL of N light beams input from the partial reflector 34 to space; and an optical collimator 42 for collimating frequency modulated light (frequency modulated local oscillation light) input from the light frequency shifter 14. The optical beam splitter 41 reflects collimated frequency modulated light in a direction of the front optical system 30. As a result, N interference light signals (light beat signals) are generated by multiplexing of the N partially reflected light signals and the frequency modulated light.

Referring to FIG. 2, the light circulator $63_n$ separates an amplified light signal input from the light amplifier $62_n$ and an interference light signal input from the light path $B_n$ from each other, and outputs the interference light signal to the photoelectric converter $64_n$. The photoelectric converter $64_n$ converts the interference light signal into an electric signal (beat signal) $BS_n$, and outputs the electric signal $BS_n$ to a slave port of the phase comparator $73_n$ of the phase locked loop $65_n$. The phase comparator $73_n$ detects a phase error between the phase shift signal $PSS_n$ input to its own reference port and the electric signal $BS_n$, and outputs a phase error signal obtained as a result to the loop filter $74_n$. The loop filter $74_n$ generates a control voltage by filtering the phase error signal. Then, the signal generator $75_n$ supplies the light phase control signal $MC_n$ having an oscillation frequency corresponding to the control voltage input from the loop filter $74_n$ to the optical phase modulator $61_n$. Consequently, phase locking is established.

The signal processing unit 50 illustrated in FIG. 1 calculates a phase for each of the element circuits $21_1$ to $21_N$ on the basis of a desired far field pattern (FFP). The control signal generating unit 53 can supply phase control signals $PC_1$ to $PC_N$ corresponding to the calculation results to the variable phase shifters $72_1$ to $72_N$ of the element circuits $21_1$ to $21_N$, respectively.

As described above, in the first embodiment, the N partially reflected light signals propagating in an opposite direction are generated in the front optical system 30. The photoelectric converters (photodetectors) $64_1$ to $64_N$ of the element circuits $22_1$ to $22_N$ can convert N interference light signals generated by multiplexing of the N partially reflected light signals and local oscillation light into electric signals (beat signals) $BS_1$ to $BS_N$, respectively, and the phase locked loops $65_1$ to $65_N$ can generate light phase control signals $MC_1$ to $MC_N$ for phase error compensation on the basis of the electric signals $BS_1$ to $BS_N$. Since the degree to which the number N of signals is limited by the band characteristics of the photoelectric converters (photodetectors) $64_1$ to $64_N$ is low, the number N of signals can be increased, and the size of a device configuration required for coherent beam combining can be reduced.

In addition, since the interference light signals are propagated through the coaxial light paths $B_1$ to $B_N$, it is possible to prevent deterioration of a light receiving efficiency caused by alignment of the photoelectric converters $64_1$ to $64_N$. Even when the number N of signals is large, it is possible to detect a phase error without deteriorating the light receiving efficiency. Therefore, it is possible to provide the laser device 1 that can be easily manufactured, is small, and is excellent in environmental robustness.

Note that in the first embodiment, the optical phase modulators $61_1$ to $61_N$ are used for light phase control, but it is not limited thereto. In the first embodiment and second to fifth embodiments described below, a light frequency shifter may be used instead of the optical phase modulators $61_1$ to $61_N$.

In the first embodiment, the light frequency shifter 14 is used for phase error detection by heterodyne detection, but it is not limited thereto. In the first embodiment and second to fifth embodiments described below, when phase error detection by homodyne detection is performed, the light frequency shifter 14 is unnecessary.

Second Embodiment

Figure 3:
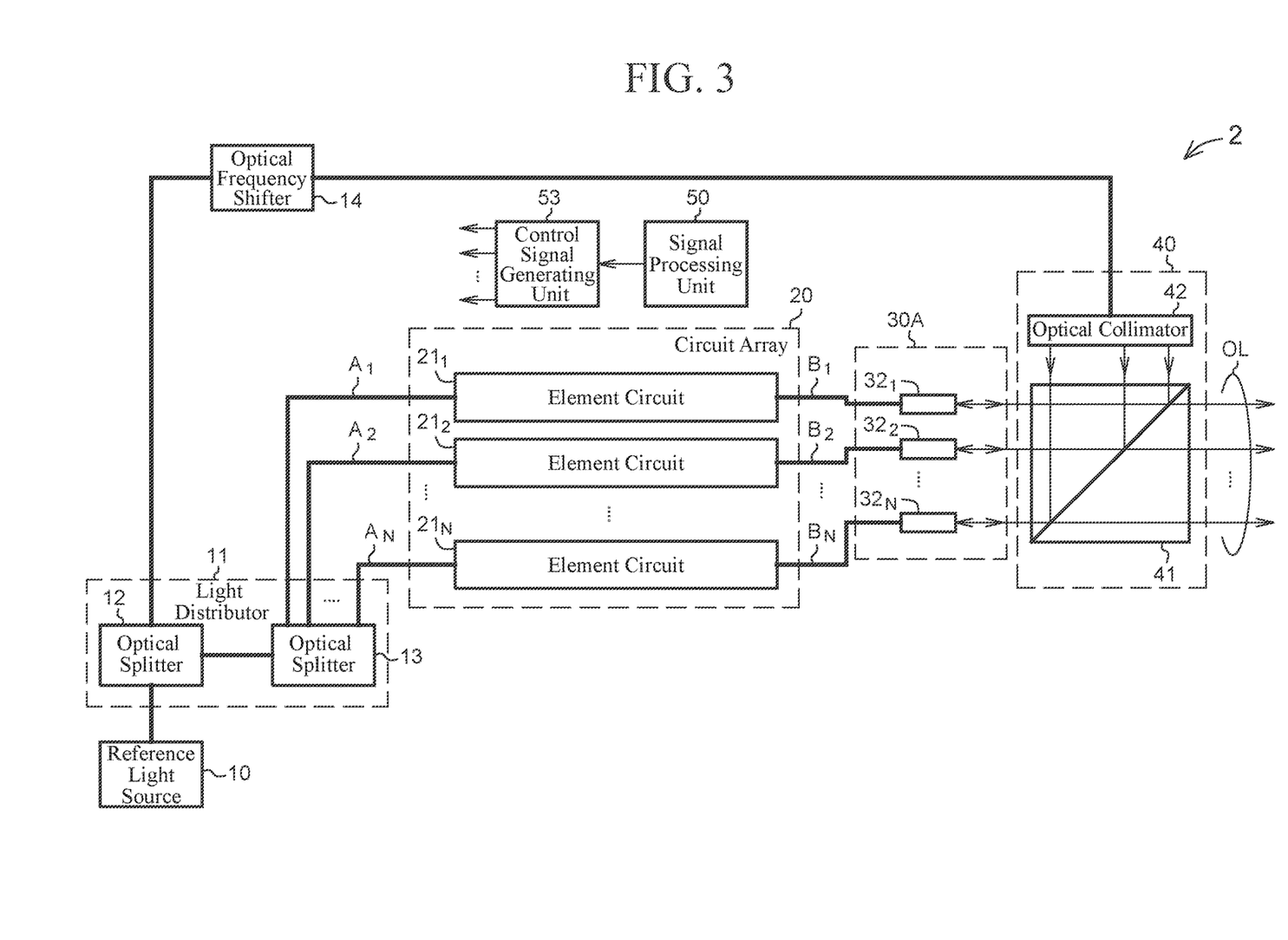
FIG. 3 is a diagram illustrating a schematic configuration of a laser device of a second embodiment according to the present invention.

Next, a second embodiment according to the present invention will be described. FIG. 3 is a diagram illustrating a schematic configuration of a laser device 2 of the second embodiment according to the present invention. As described above, in the first embodiment, the partial reflector 34 is used for generating partially reflected light signals. On the other hand, in the present embodiment, partially reflected light signals are generated without using the partial reflector 34.

A configuration of the laser device 2 illustrated in FIG. 3 is the same as the configuration of the laser device 1 of the first embodiment except that a front optical system 30A is included instead of the front optical system 30 of the first embodiment.

Figure 4:
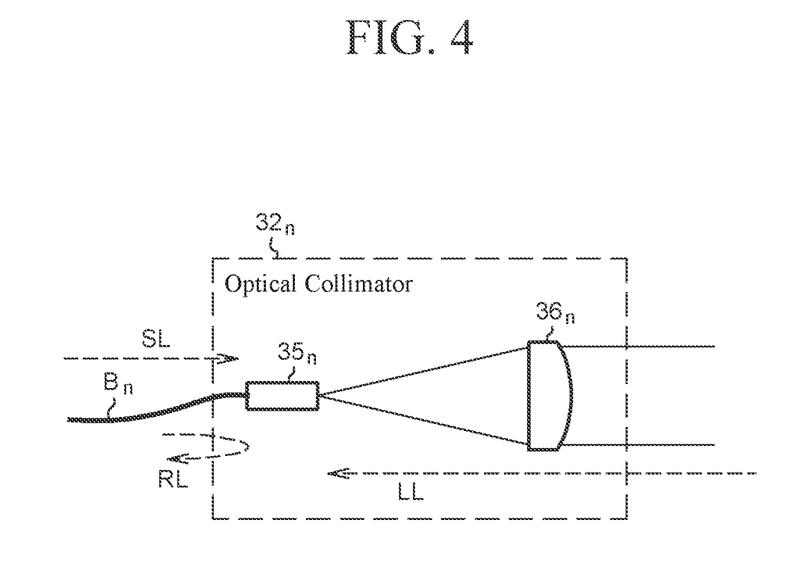
FIG. 4 is a diagram schematically illustrating a configuration example of an optical collimator of the second embodiment.

The front optical system 30A illustrated in FIG. 3 includes N optical collimators $32_1$, $32_2$, ..., and $32_N$ connected to ends of light paths $B_1$, $B_2$, ..., and $B_N$, respectively. FIG. 4 is a diagram illustrating a schematic configuration of an n-th optical collimator $32_n$ out of the optical collimator $32_1$ to $32_N$.

The optical collimator $32_n$ illustrated in FIG. 4 includes: an optical connector $35_n$ optically coupled to an end portion of the light path $B_n$ such as an optical fiber; and a collimator lens $36_n$ for forming a light beam by collimating light emitted from the optical connector $35_n$. The optical connector $35_n$ outputs a phase modulated light signal SL propagated through the light path $B_n$ to space. The collimator lens $36_n$ is disposed at a position separated from a light emitting end of the optical connector $35_n$ by a focal length, and converts light emitted from the optical connector $35_n$ into a collimated light beam.

The optical connector $35_n$ transmits most of the phase modulated light signal (phase control light signal) SL input from the light path $B_n$, and at the same time, generates a partially reflected light signal (Fresnel reflected light) RL by causing Fresnel reflection of the phase modulated light signal SL.

At an end of the optical connector $35_n$, Fresnel reflection occurs due to a difference in refractive index between air and a propagation medium of the light path $B_n$ such as an optical fiber. Examples of an end surface of a commonly used optical fiber connector include a flatly polished end surface and an obliquely polished end surface. Reflected light of about 20 dB is generated at the flatly polished end surface, and reflected light of about 60 dB is generated at the obliquely polished end surface. A method for polishing an end surface can be determined depending on performance of a light amplifier $62_n$. For example, when an output light power of the light amplifier $62_n$ is about 20 dBm, a constant received light power can be obtained by selecting the flatly polished end surface. When the output light power of the light amplifier $62_n$ is 40 dBm or more, a constant received light power can be obtained by selecting oblique polishing or super physical contact (SPC) polishing.

As in the case of the first embodiment, an interference light signal (light beat signal) is generated by multiplexing of the partially reflected light signal RL and frequency modulated light (frequency modulated local oscillation light) LL. An element circuit $21_n$ can compensate for a phase error on the basis of the interference light signal.

As described above, in the second embodiment, since the components of the spatial optical system for obtaining the partially reflected light signal are unnecessary, the highly robust and alignment-free laser device 2 can be provided. In addition, since an influence of interference due to leakage light between adjacent light signals in a circuit array 20, that is, in an optical phased array can be eliminated, an interval between the element circuits $21_1$ to $21_N$ can be made dense. Furthermore, since a photosynthesis efficiency of the optical phased array is determined by the ratio of the interval to a beam diameter, it is possible to implement an optical phased array with a high synthesis efficiency using the configuration of the present embodiment.

Third Embodiment

Figure 5:
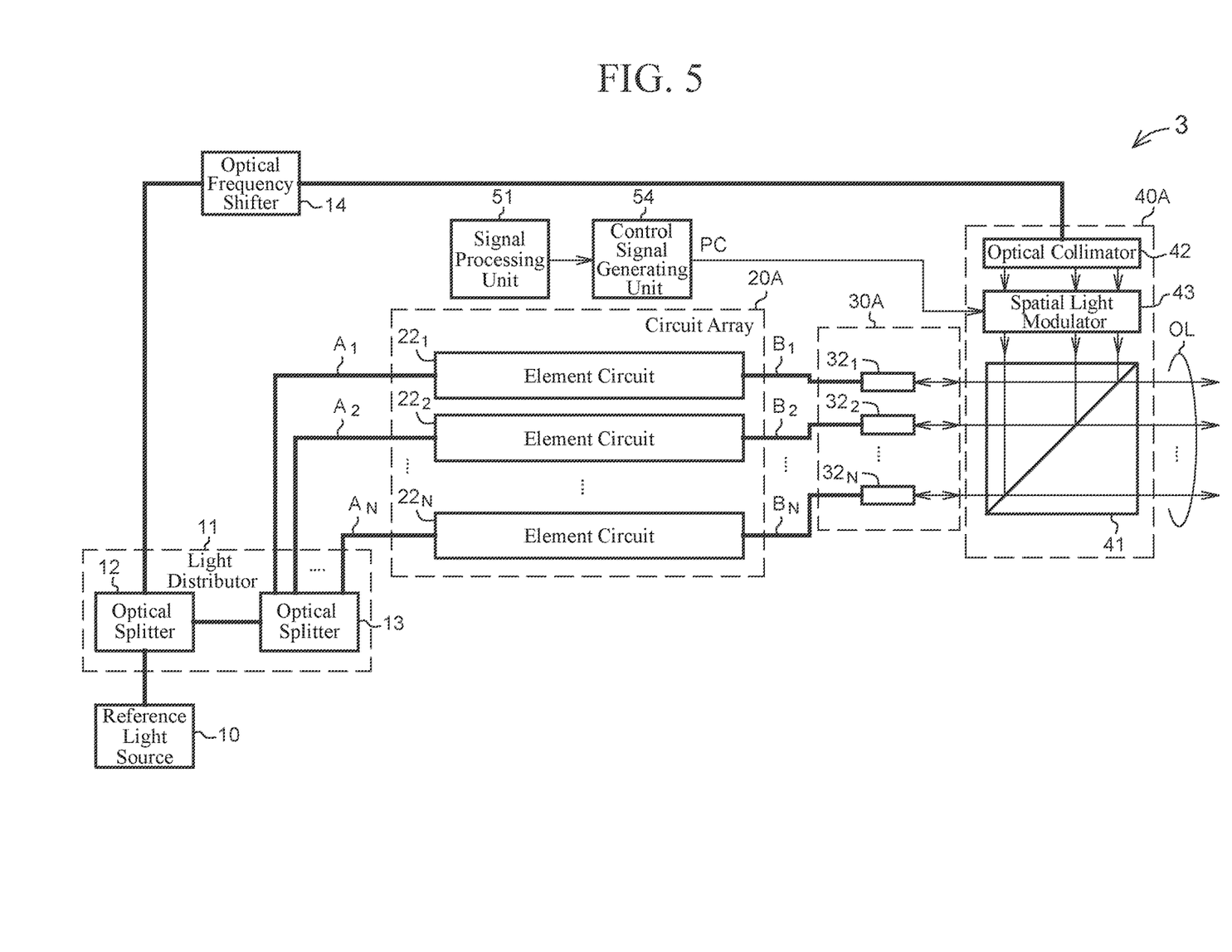
FIG. 5 is a diagram illustrating a schematic configuration of a laser device of a third embodiment according to the present invention.

Next, a third embodiment according to the present invention will be described. FIG. 5 is a diagram illustrating a schematic configuration of a laser device 3 of the third embodiment according to the present invention. The configuration of the laser device 3 of the present embodiment is the same as the configuration of the laser device 2 of the second embodiment except that a beam combining optical system 40A is included instead of the beam combining optical system 40 of the second embodiment, a set of a signal processing unit 51 and a control signal generating unit 54 is included instead of the set of the signal processing unit 50 and the control signal generating unit 53, and a circuit array 20A is included instead of the circuit array 20.

The configuration of the beam combining optical system 40A illustrated in FIG. 5 is the same as the configuration of the beam combining optical system 40 of the second embodiment except that a spatial light modulator 43 is interposed in a space between an optical collimator 42 and an optical beam splitter 41. The spatial light modulator 43 generates spatially modulated light by spatially modulating collimated light input from the optical collimator 42. By using this spatially modulated light, it is possible to collectively convert a phase of an output wave front of the circuit array 20A functioning as an optical phased array.

The signal processing unit 51 calculates the phase of the output wave front on the basis of a desired FFP. The control signal generating unit 54 supplies a modulation control signal PC corresponding to the calculation result to the spatial light modulator 43. As a result, the variable phase shifters $72_1$ to $72_N$ (FIG. 2) in the phase locked loops $65_1$ to $65_N$ of each of the first and second embodiments are unnecessary.

As illustrated in FIG. 5, the circuit array 20A of the present embodiment includes N element circuits $22_1$, $22_2$, ..., and $22_N$ arranged in parallel. First ends of the element circuits $22_1$, $22_2$, ..., and $22_N$ are optically coupled to light output terminals of light paths $A_1$, $A_2$, ..., and $A_N$, respectively. Second ends of the element circuits $22_1$, $22_2$, ..., and $22_N$ are optically coupled to light paths $B_1$, $B_2$, ..., and $B_N$ such as optical fibers, respectively.

Figure 6:
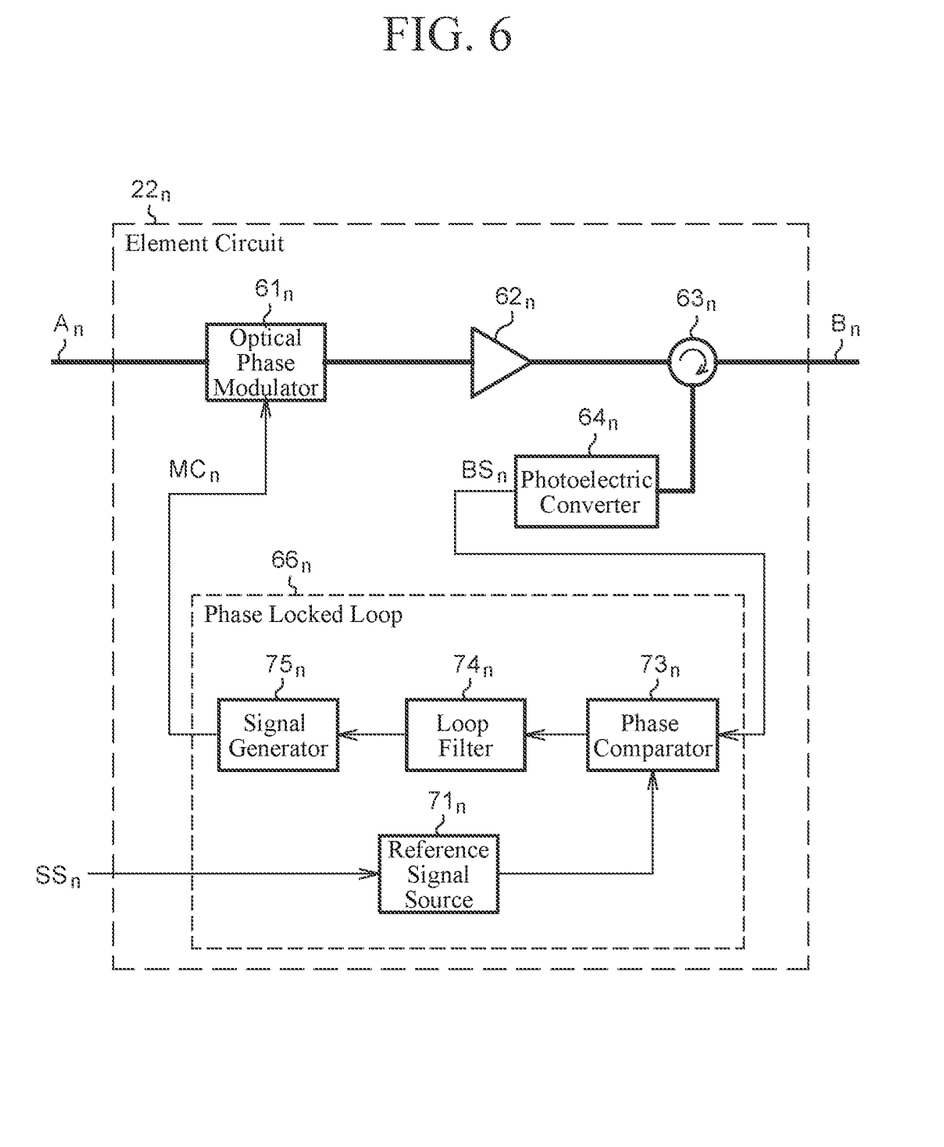
FIG. 6 is a diagram schematically illustrating a configuration example of an element circuit of the third embodiment.

FIG. 6 is a diagram illustrating an example of a schematic configuration of an n-th element circuit $22_n$ (n is an integer within a range of 1 to N) out of the element circuits $22_1$ to $22_N$. The element circuit $22_n$ includes an optical phase modulator $61_n$, a light amplifier $62_n$, a light circulator $63_n$, a photoelectric converter $64_n$, and a phase locked loop $66_n$. The configuration of the element circuit $22_n$ illustrated in FIG. 6 is the same as the configuration obtained by removing the variable phase shifter $72_n$ from the element circuits $21_n$ of each of the first and second embodiments.

Referring to FIG. 5, the optical beam splitter 41 reflects spatially modulated light input from the spatial light modulator 43 in a direction of the front optical system 30A. As a result, the spatially modulated light is input to the front optical system 30A. As a result, N interference light signals (light beat signals) are generated by multiplexing of the N partially reflected light signals and the spatially modulated light. A phase error generated at this time is a phase error at a position where multiplexing occurs. In the present embodiment, multiplexing occurs at ends of the optical connectors $35_1$ to $35_N$ (ends where Fresnel reflection occurs).

A phase plane of the spatially modulated light is recognized as offset phase errors of the element circuits $22_1$ to $22_N$ in phase comparators $73_1$ to $73_N$ of the phase locked loops $66_1$ to $66_N$. Therefore, when phase locking is established with respect to reference signal sources $71_1$ to $71_N$, an antiphase plane with respect to the phase plane of the spatially modulated light becomes an output wave front of the optical phased array.

As described above, the laser device 3 of the third embodiment can compensate for a phase error on the basis of N interference light signals (light beat signals) generated by multiplexing of spatially modulated light and N partially reflected light signals, and therefore can collectively perform offset phase control (wave front control) of the circuit array 20A, that is, the optical phased array. This makes it possible to reduce the number of components and to reduce the size of the device configuration.

In addition, the laser device 3 of the third embodiment can also be incorporated in a system for measuring and correcting wave front fluctuations caused by atmospheric fluctuations from scattered light or received light generated after atmospheric propagation of a bundle OL of output light beams of the optical phased array. For example, the laser device 3 of the third embodiment can be incorporated in a compensation optical system (not illustrated) including a wave front sensor for detecting wave front fluctuations caused by atmospheric fluctuations as a spatial phase distribution. In this case, the signal processing unit 51 of the present embodiment can add a signal indicating an offset phase corresponding to the phase distribution to the modulation control signal PC by controlling the control signal generating unit 54 on the basis of a detection output of the wave front sensor. The spatial light modulator 43 can compensate for wave front fluctuations caused by atmospheric fluctuations in accordance with the modulation control signal PC. Conventionally, there have been cases where fluctuations in light intensity of the scattered light or the received light and fluctuations in a propagation direction thereof occur due to an influence of atmospheric fluctuations. However, in the present embodiment, by compensating for wave front fluctuations caused by atmospheric fluctuations, such fluctuations in light intensity and such fluctuations in a propagation direction can be suppressed. Examples of the compensation optical system include a laser guide compensation light system for generating and utilizing a laser guide star. The laser guide star is an artificial guide star generated by irradiating a sodium layer in the atmosphere at an altitude of about 90 km with high-power laser light.

Fourth Embodiment

Figure 7:
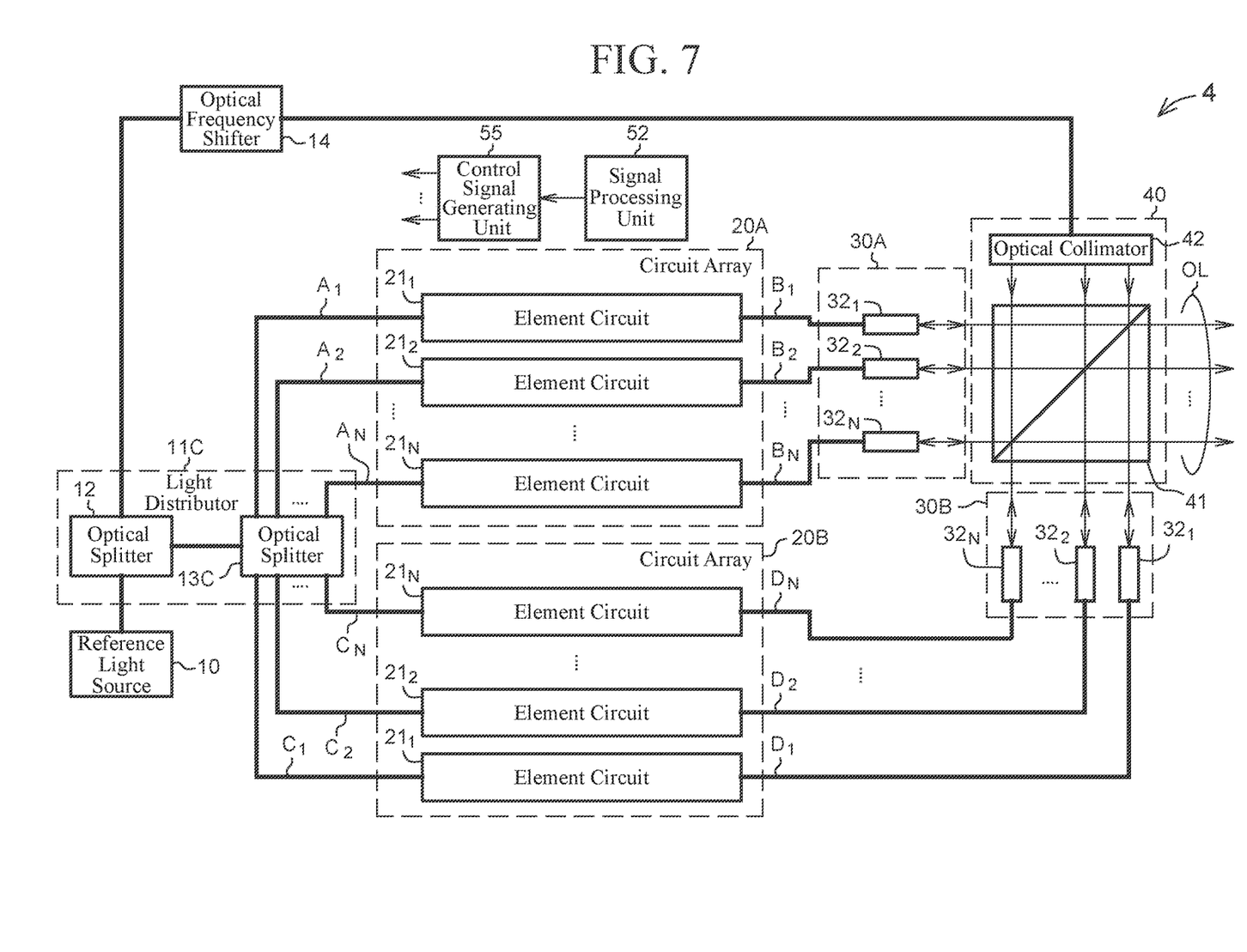
FIG. 7 is a diagram illustrating a schematic configuration of a laser device of a fourth embodiment according to the present invention.

Next, a fourth embodiment according to the present invention will be described. In the first to third embodiments described above, the number of circuit arrays is one, but it is not limited thereto. There may be an embodiment including a plurality of circuit arrays (subarrays). FIG. 7 is a diagram illustrating a schematic configuration of a laser device 4 of the fourth embodiment according to the present invention.

As illustrated in FIG. 7, the laser device 4 includes two circuit arrays 20A and 20B, a reference light source 10, a light distributor 11C for distributing reference laser light into local oscillation light and 2×N light signals (N is a positive integer of 2 or more), a light frequency shifter 14 for shifting a light frequency of local oscillation light, front optical systems 30A and 30B, and a beam combining optical system 40. In addition, the laser device 4 includes a signal processing unit 52 and a control signal generating unit 55.

The light distributor 11C includes two optical splitters 12 and 13C. The optical splitter 12 splits reference laser light input from the reference light source 10 into local oscillation light and signal light, supplies the local oscillation light to the light frequency shifter 14 via a light path, and supplies the signal light to the optical splitter 13C. The optical splitter 13C splits the input signal light into 2×N light signals, supplies the N light signals to the circuit array 20A via light paths $A_1, A_2, \ldots,$ and $A_N$ such as optical fibers, and supplies the remaining N light signals to the circuit array 20B via light paths $C_1, C_2, \ldots,$ and $C_N$ such as optical fibers.

The circuit array 20A is connected to the front optical system 30A via light paths $B_1, B_2, \ldots,$ and $B_N$, and the circuit array 20B is connected to the front optical system 30B via light paths $D_1, D_2, \ldots,$ and $D_N$. The configuration of each of the circuit arrays 20A and 20B is the same as the configuration of the circuit array 20 of the first embodiment, and the configuration of each of the front optical systems 30A and 30B is the same as the configuration of the front optical system 30A of the second embodiment. Here, the configuration of each of the front optical system 30A and 30B may be changed to the configuration of the front optical system 30 of the first embodiment.

An optical beam splitter 41 of the beam combining optical system 40 can generate a bundle OL of output light beams by multiplexing the N light beams input from the front optical system 30A and the N light beams input from the front optical system 30B. In the present embodiment, since a transmission light path of the optical beam splitter 41, which is not used in the first to third embodiments, is used, there is an advantage that a signal light power is not deteriorated.

Figure 8A:
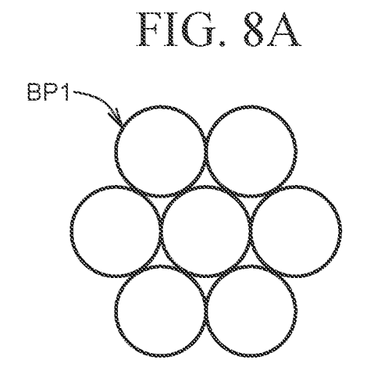
FIGS. 8A to 8C are diagrams illustrating examples of a beam pattern of output light according to the fourth embodiment.
Figure 8B:
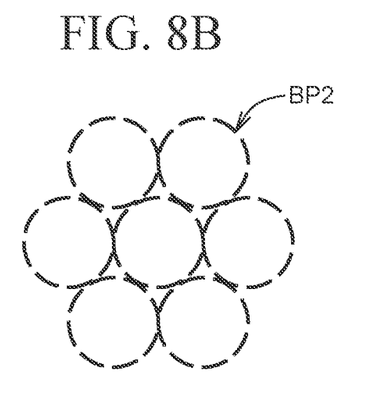
Figure 8C:
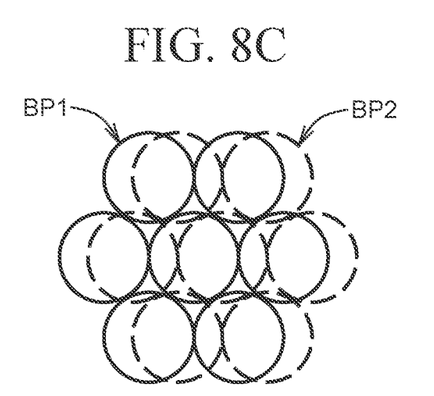

FIGS. 8A to 8C are diagrams illustrating examples of a beam pattern of output light. FIG. 8A illustrates a beam pattern BP1 of output light generated by the circuit array 20A including seven element circuits $21_1$ to $21_7$ and the front optical system 30A, and FIG. 8B illustrates a beam pattern BP2 of output light generated by the circuit array 20B including seven element circuits $21_1$ to $21_7$ and the front optical system 30B. FIG. 8C illustrates a beam pattern of output light of the optical beam splitter 41. As illustrated in FIG. 8C, the beam patterns BP1 and BP2 can be arranged so as to overlap each other. A synthesis efficiency of the optical phased array is determined by the ratio of a distance between the element circuits to a beam diameter. By using the present embodiment, a beam interval distance can be made small without being mechanically restricted by a collimator lens. This makes it possible to implement an optical phased array having a synthesis efficiency of 80% or more.

As described above, in the fourth embodiment, it is possible to implement an optical phased array having a low side lobe and a high synthesis efficiency.

Various embodiments according to the present invention have been described above with reference to the drawings. The above embodiments are examples of the present invention, and there may be various embodiments other than the above embodiments and modifications thereof. The above embodiments can be freely combined with one another, any component in the embodiments can be modified, or any component in the embodiments can be omitted within the scope of the present invention. In the above embodiments, a light amplifier $62_n$ for amplifying a light output of an optical phase modulator $61_n$ is included. However, instead of the light amplifier $62_n$, a light amplifier for amplifying a light signal input from the light path $A_n$ may be included.

Figure 9:
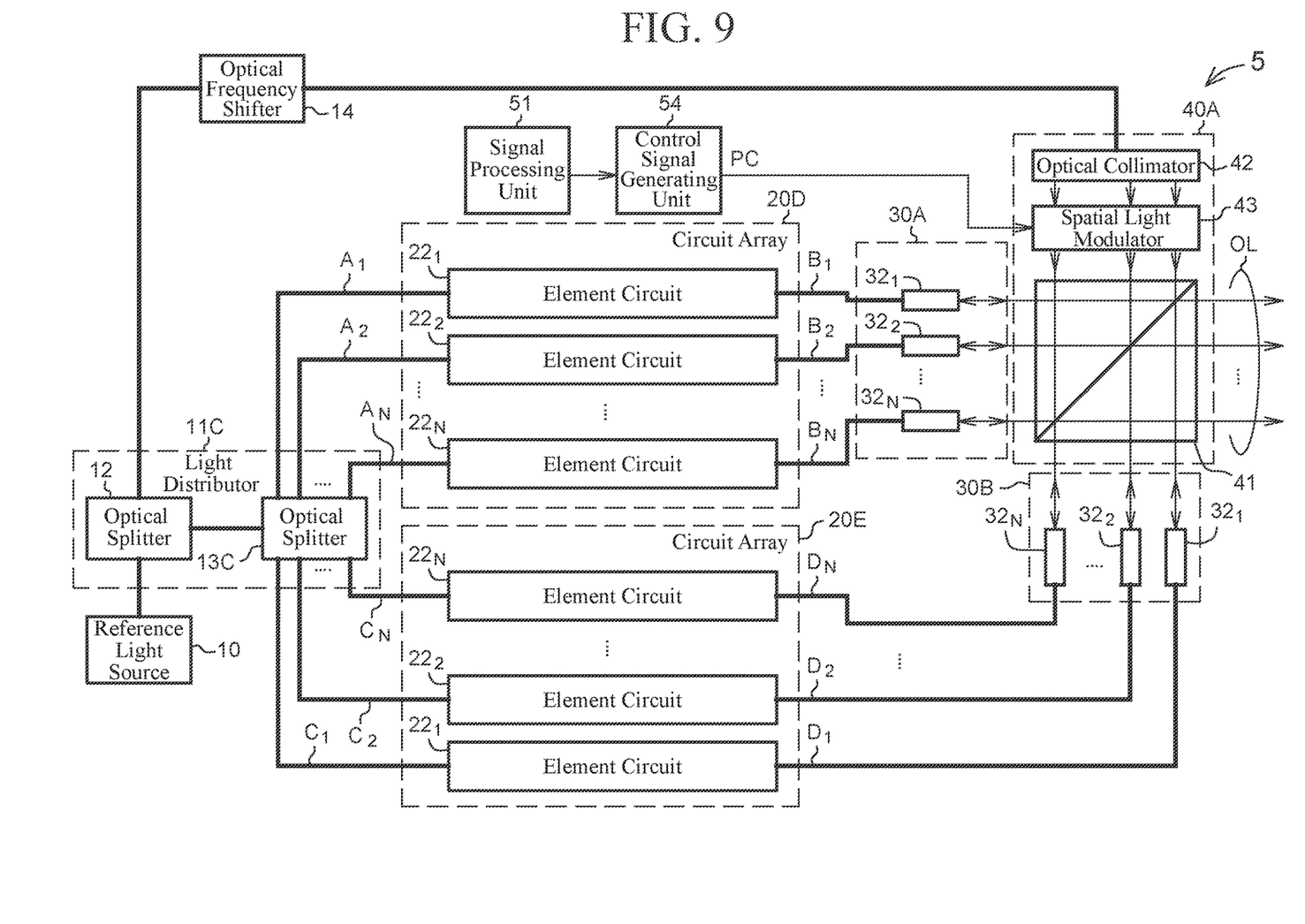
FIG. 9 is a diagram illustrating a schematic configuration of a laser device of a fifth embodiment according to the present invention.

For example, there may be an embodiment in which the beam combining optical system 40A of the third embodiment is used instead of the beam combining optical system 40 of the fourth embodiment. FIG. 9 is a diagram illustrating a schematic configuration of a laser device 5 of such an embodiment.

In addition, in the above-described front optical systems 30, 30A, and 30B, a general fiber collimator can be used, but it is not limited thereto. Any lens can be used as long as the lens has a reflection end surface that generates a partially reflected light signal. For example, a refractive index distribution type gradient index lens (GRIN lens) may be used.

INDUSTRIAL APPLICABILITY

The laser device according to the present invention can be used in various technical fields requiring propagation of laser light in space. For example, the laser device according to the present invention can be used in an optical space communication technique, a laser processing technique, a laser measurement technique, a laser illumination technique, a laser microscope technique, and a laser guide star generation technique for wave front compensation of a large telescope.

REFERENCE SIGNS LIST 1 to 5: Laser device, 10: Reference light source, 11, 11C: Light distributor, 12, 13, 13C: Optical splitter, 14: Light frequency shifter, 20, 20A to 20E: Circuit array, $21_1$ to $21_N$, $22_1$ to $22_N$: Element circuit, 30: Front optical system, 30A, 30B: Front optical system, $31_1$ to $31_N$, $32_1$ to $32_N$: Optical collimator, 34: Partial reflector, $35_n$: Optical connector, $36_n$: Collimator lens, 40, 40A: Beam combining optical system, 41: Optical beam splitter, 42: Optical collimator, 43: Spatial light modulator, 50 to 52: Signal processing unit, 53 to 55: Control signal generating unit, $61_n$: Optical phase modulator, $62_n$: Light amplifier, $63_n$: Light circulator, $64_n$: Photoelectric converter (photodetector), $65_n$, $66_n$: Phase locked loop, $71_n$: Reference signal source, $72_n$: Variable phase shifter, $73_n$: Phase comparator, $74_n$: Loop filter, $75_n$: Signal generator

The invention claimed is:

1. A laser device comprising:
a light distributor distributing reference laser light into local oscillation light and a plurality of light signals;
a plurality of optical phase controllers generating a plurality of phase control light signals by performing variable phase control on each of the plurality of light signals in accordance with a plurality of input light phase control signals;
a plurality of light amplifiers generating a plurality of amplified light signals by amplifying the plurality of phase control light signals;
a front optical system forming a plurality of light beams by collimating the plurality of amplified light signals and generating a plurality of partially reflected light signals propagating in a direction opposite to a propagation direction of the plurality of light beams by partially reflecting the plurality of amplified light signals;
a reflective optical system multiplexing the local oscillation light with the plurality of partially reflected light signals by reflecting the local oscillation light input from the light distributor in a direction of the front optical system;
a plurality of photodetectors converting each of a plurality of interference light signals generated by multiplexing of the plurality of partially reflected light signals and the local oscillation light into a plurality of electric signals; and
a plurality of phase locked loops generating, as the plurality of light phase control signals, a plurality of control signals for causing the plurality of optical phase controllers to compensate for phase errors between the plurality of electric signals and a reference signal.

2. The laser device according to claim 1, wherein the front optical system includes a partial reflector generating the plurality of partially reflected light signals.

3. The laser device according to claim 2, wherein
the front optical system includes a plurality of optical collimators collimating the plurality of phase control light signals, and
the partial reflector generates the plurality of partially reflected light signals by partially reflecting light outputs of the plurality of optical collimators.

4. The laser device according to claim 1, wherein the front optical system includes a plurality of optical connectors generating the plurality of partially reflected light signals by causing Fresnel reflection of the plurality of phase control light signals.

5. The laser device according to claim 4, wherein the front optical system further includes a plurality of collimator lenses forming the plurality of light beams by collimating light outputs of the plurality of optical connectors.

6. The laser device according to claim 1, further comprising
a spatial light modulator generating spatially modulated light by spatially modulating the local oscillation light input from the light distributor, wherein
the reflective optical system multiplexes the spatially modulated light with the plurality of partially reflected light signals by reflecting the spatially modulated light in a direction of the front optical system.

7. The laser device according to claim 1, further comprising:
a plurality of optical fibers propagating the plurality of phase control light signals to the front optical system and propagating the plurality of interference light signals in a direction opposite to a propagation direction of the plurality of phase control light signals; and
a plurality of light circulators separating the plurality of phase control light signals and the plurality of interference light signals from each other.

8. The laser device according to claim 1, wherein the reflective optical system includes an optical beam splitter reflecting the local oscillation light in a direction of the front optical system.

9. A laser device comprising:
a light distributor distributing reference laser light into local oscillation light and a plurality of light signals;
a plurality of light amplifiers generating a plurality of amplified light signals by amplifying the plurality of light signals;
a plurality of optical phase controllers generating a plurality of phase control light signals by performing variable phase control on each of the plurality of amplified light signals in accordance with a plurality of input light phase control signals;
a front optical system forming a plurality of light beams by collimating the plurality of phase control light signals and generating a plurality of partially reflected light signals propagating in a direction opposite to a propagation direction of the plurality of light beams by partially reflecting the plurality of phase control light signals;
a reflective optical system multiplexing the local oscillation light with the plurality of partially reflected light signals by reflecting the local oscillation light input from the light distributor in a direction of the front optical system;

a plurality of photodetectors converting each of a plurality of interference light signals generated by multiplexing of the plurality of partially reflected light signals and the local oscillation light into a plurality of electric signals; and a plurality of phase locked loops generating, as the plurality of light phase control signals, a plurality of control signals for causing the plurality of optical phase controllers to compensate for phase errors between the plurality of electric signals and a reference signal.

10. A laser device comprising:
a plurality of circuit arrays each including a plurality of optical phase controllers, a plurality of light amplifiers, a plurality of photodetectors, and a plurality of phase locked loops;
a light distributor distributing reference laser light into local oscillation light and a plurality of light signals to be supplied to each of the plurality of circuit arrays;
a plurality of front optical systems respectively arranged corresponding to the plurality of circuit arrays; and
a reflective optical system, wherein
the plurality of optical phase controllers generates a plurality of phase control light signals by performing variable phase control on each of the plurality of light signals in accordance with a plurality of input light phase control signals,
the plurality of light amplifiers generates a plurality of amplified light signals by amplifying the plurality of phase control light signals,
each of the plurality of front optical systems forms a plurality of light beams by collimating the plurality of amplified light signals and generates a plurality of partially reflected light signals propagating in a direction opposite to a propagation direction of the plurality of light beams by partially reflecting the plurality of amplified light signals,
the reflective optical system multiplexes the local oscillation light with the plurality of partially reflected light signals by reflecting the local oscillation light input from the light distributor in a direction of each of the front optical systems,
the plurality of photodetectors converts each of a plurality of interference light signals generated by multiplexing of the plurality of partially reflected light signals and the local oscillation light into a plurality of electric signals, and
the plurality of phase locked loops generates, as the plurality of light phase control signals, a plurality of control signals for causing the plurality of optical phase controllers to compensate for phase errors between the plurality of electric signals and a reference signal.

11. The laser device according to claim 10, wherein each of the front optical systems includes a partial reflector generating the plurality of partially reflected light signals.

12. The laser device according to claim 11, wherein each of the front optical systems includes a plurality of optical collimators collimating the plurality of phase control light signals, and
the partial reflector generates the plurality of partially reflected light signals by partially reflecting light outputs of the plurality of optical collimators.

13. The laser device according to claim 10, wherein each of the front optical systems includes a plurality of optical connectors generating the plurality of partially reflected light signals by causing Fresnel reflection of the plurality of phase control light signals.

14. The laser device according to claim 13, wherein each of the front optical systems further includes a plurality of collimator lenses forming the plurality of light beams by collimating light outputs of the plurality of optical connectors.

15. The laser device according to claim 10, further comprising
a spatial light modulator generating spatially modulated light by spatially modulating the local oscillation light input from the light distributor, wherein
the reflective optical system multiplexes the spatially modulated light with the plurality of partially reflected light signals by reflecting the spatially modulated light in a direction of each of the front optical systems.

16. The laser device according to claim 10, further comprising:
a plurality of optical fibers propagating the plurality of phase control light signals to each of the front optical systems and propagating the plurality of interference light signals in a direction opposite to a propagation direction of the plurality of phase control light signals; and
a plurality of light circulators separating the plurality of phase control light signals and the plurality of interference light signals from each other.

17. The laser device according to claim 10, wherein the reflective optical system includes an optical beam splitter reflecting the local oscillation light in a direction of each of the front optical systems.

18. A laser device comprising:
a plurality of circuit arrays each including a plurality of light amplifiers, a plurality of optical phase controllers, a plurality of photodetectors, and a plurality of phase locked loops;
a light distributor distributing reference laser light into local oscillation light and a plurality of light signals to be supplied to each of the plurality of circuit arrays;
a plurality of front optical systems respectively arranged corresponding to the plurality of circuit arrays; and
a reflective optical system, wherein
the plurality of light amplifiers generates a plurality of amplified light signals by amplifying the plurality of light signals,
the plurality of optical phase controllers generates a plurality of phase control light signals by performing variable phase control on each of the plurality of amplified light signals in accordance with a plurality of input light phase control signals,
the plurality of light amplifiers generates a plurality of amplified light signals by amplifying the plurality of phase control light signals,
each of the plurality of front optical systems forms a plurality of light beams by collimating the plurality of amplified light signals and generates a plurality of partially reflected light signals propagating in a direction opposite to a propagation direction of the plurality of light beams by partially reflecting the plurality of amplified light signals,
the reflective optical system multiplexes the local oscillation light with the plurality of partially reflected light signals by reflecting the local oscillation light input from the light distributor in a direction of each of the front optical systems,
the plurality of photodetectors converts each of a plurality of interference light signals generated by multiplexing of the plurality of partially reflected light signals and the local oscillation light into a plurality of electric signals, and the plurality of phase locked loops generates, as the plurality of light phase control signals, a plurality of control signals for causing the plurality of optical phase controllers to compensate for phase errors between the plurality of electric signals and a reference signal.

\* \* \* \* \*